Sept. 2, 1958

A. M. LEVINE 2,850,564

TELEVISION RECEIVER

Filed Jan. 29, 1953

INVENTOR
ARNOLD M. LEVINE
BY
ATTORNEY 2,850,564
Patented Sept. 2, 1958

2,850,564

TELEVISION RECEIVER

Arnold M. Levine, River Edge, N. J., assignor to International Telephone and Telegraph Corporation, a corporation of Maryland Application January 29, 1953, Serial No. 333,961

6 Claims. (Cl. 178—5.8)

Figure 1:
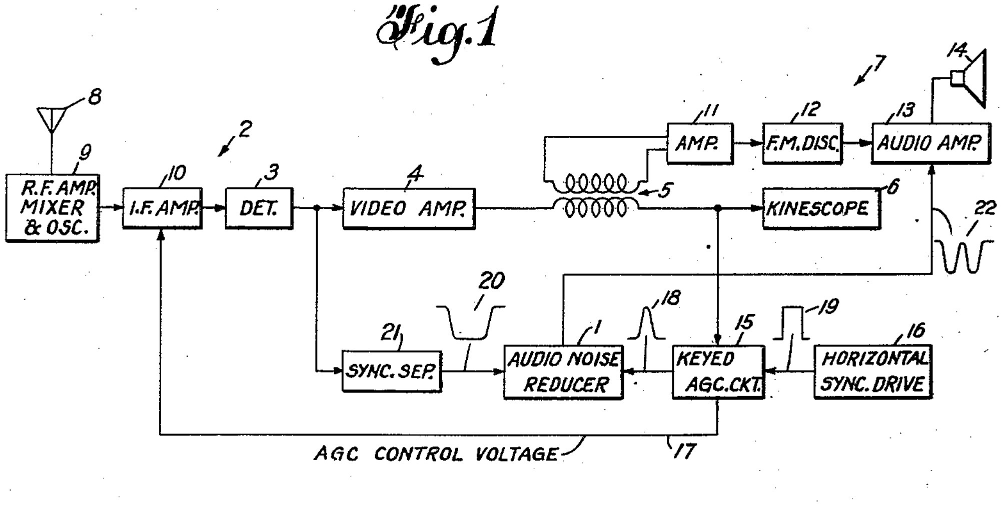

This invention relates to television receivers and more particularly to means for substantially eliminating audio noise during the warm-up period of a television receiver.

Keyed automatic gain control has been recognized by the television industry to be by far the best type of automatic gain control (AGC) for television receivers. Although many different circuit configurations have been set-up in the prior art to accomplish keyed AGC there is still a difficulty which arises in its use which is annoying to the consumer. This annoyance is a relatively loud "popping" noise that is heard during the warm-up period of a television receiver. While some of the conventional receivers using separate circuits for both sound and picture signals may have this disturbing noise to a certain extent, it is particularly noticeable in all commercial sets employing an intercarrier sound system.

The noise heard during the warm-up time is caused by the lack of coincidence between the keying pulse activating the AGC circuitry and the synchronizing tips separated from the normal RTMA television signal causing an extraneous modulation as the keying pulse attempts to "lock in" with the synchronizing tips. This lack of coincidence results from the fact that the horizontal oscillator AFC, developing said keying pulse, requires a given period of time to take hold when the receiver is first turned on causing a rapid shift or "running" of keying pulse frequency. Once the warm-up period is over, the keying pulse frequency will be stabilized, coincidence will occur and the "popping" noise is no longer present. However, the noise present during "lock in" or warm-up is a source of disturbance to the consumer. Therefore, it is an object of this invention to provide a television receiver employing keyed AGC which is substantially noise free during the warm-up period.

Another object of this invention is the provision of an audio noise reducer incorporated in a keyed AGC intercarrier sound television receiver providing a noiseless warm-up period.

A feature of this invention is the provision of circuitry associated with synchronizing pulses from the synchronization separation circuit, the differentiated keying pulse from the horizontal synchronizing driver stage, and the audio or sound I. F. stage in such a manner that the latter stage is made inoperative during the warm-up period.

Another feature of this invention is the provision of a means associated with the synchronization separation circuit, the differentiated output from the horizontal synchronizing driver stage, and an audio stage wherein the voltage from the output of said driver stage applied thereto couples a negative voltage to the grid of said audio stage having an amplitude great enough to cut-off said audio stage during non-coincidence of the output of the horizontal driver and the synchronizing separator circuit. At the time of coincidence of these two outputs, the cut-off voltage is removed from the grid of said audio stage by the output of said synchronizing separating circuit effectively cancelling the cutting-off voltage developed by the output of said driver stage.

Figure 2:
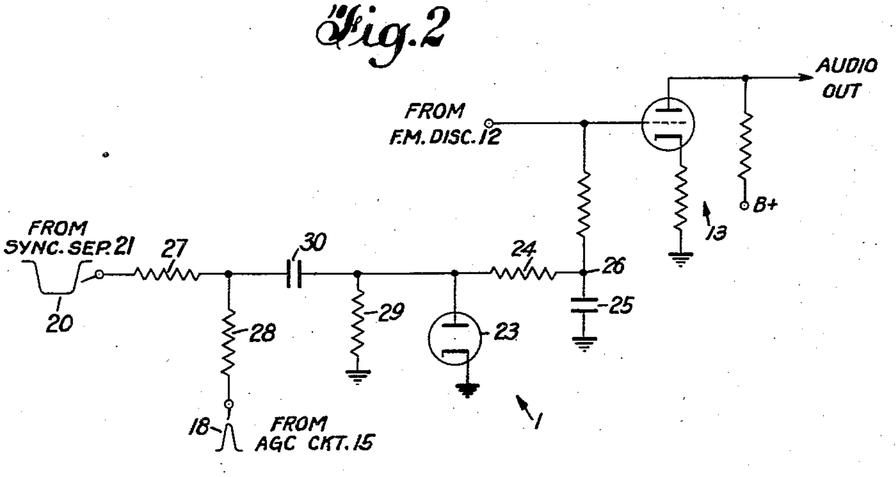

The above-mentioned and other features and objects of this invention will become more apparent by reference to the following description taken in conjunction with the accompanying drawings, in which:

Fig. 1 is a block diagram of a television receiver according to the principles of this invention; and Fig. 2 is a schematic diagram of an embodiment of the noise reducer of Fig. 1.

Referring to Fig. 1, a representative television receiver of the intercarrier sound type employing the noise reducer means 1 of my invention is shown to cooperate with conventional circuitry to substantially eliminate the "pop" from the TV receiver during warm-up or "lock in" time. The TV receiver is shown to essentially comprise a source 2 of video signals including the usual synchronization information and the sound carrier located 4.5 megacycles below the picture carrier, a second video detector 3, a video amplifier 4, a transformer 5 to extract the sound from the resulting output of video amplifier 4, a kinescope 6 to reproduce the picture signal, and an audio system 7 for reproduction of the sound signal.

Source 2 is shown to comprise an antenna 8, a front end 9 including therein R.-F. amplifiers, a mixer and a local oscillator, and I. F. amplifiers 10 combined in a normal manner whereby the picture and sound signals are simultaneously amplified at the received frequency, reduced to a predetermined intermediate frequency by the action of the mixer and local oscillator, and then amplified to a predetermined level simultaneously by the I. F. amplifiers. The amplified combined signals at the intermediate frequency are coupled to detectors which has an output including a beat note between the picture and sound signals. This beat is in effect a 4.5 megacycle intermediate frequency, frequency modulated in accordance with the sound signal and amplitude modulated to a certain extent in accordance with the picture signal. This beat note with the accompanying picture and synchronizing signal is amplified by amplifier 4, the output of which is passed through transformer 5 which extracts therefrom the beat note for application to the input of audio system 7. The beat note is amplified by amplifier 11 for coupling to FM discriminator 12 which is not sensitive to possible amplitude modulation carried by said beat note. The sound modulation is thus separated from picture signal and is amplified further by audio amplifier 13 which in turn is applied to loud speaker 14 for reproduction of transmitted sound.

The picture signal is coupled to kinescope 6 for reproduction of the transmitted picture and to the keyed AGC circuit 15 which in cooperation with the output of horizontal sync drive 16 at the horizontal pulse rate of approximately 15 C. P. S. supplies a D.-C. supply voltage along the feedback path 17 to amplifier 10 thereby controlling the D.-C. level of the incoming video signal in a predetermined manner for effecting the desired gain control. The operation and circuitry of the AGC circuit 15 preferably employed herein is substantially identical with the keyed AGC circuit disclosed in my copending application Serial No. 286,369, filed May 6, 1952, wherein the pulse output from the horizontal sync drive is differentiated in a portion of the AGC circuit to effect the actual keying and renders the AGC circuit conductive for only a very short period of time providing a high noise immunity for the AGC circuit.

The representative TV receiver herein illustrated includes the noise reducer 1 responsive to the keying pulse 18 produced in circuit 15 by differentiation of the horizontal pulse 19 delivered by sync drive 16 and the horizontal sync pulse 20 delivered by the sync separator 21 which operates in a known manner upon the picture signal to derive the tips of the synchronizing pulses therefrom for synchronization of the various receiver circuits with the transmitted signal. A lack of coincidence between pulses 18 and 20 during receiver warm-up is caused by the fact that the oscillator controlling the output of drive 16 at approximately a 15 C. P. S. rate is not "locked in" causing an adverse modulation in the audio system 7 which when reproduced emits a noise disturbing to the consumer. The function of noise reducer 1 is to monitor the coincidence of pulses 18 and 20 which upon lack of coincidence produces a negative voltage with sufficient amplitude to bias off audio amplifier 13 or at least one stage thereof. Upon coincidence of pulses 18 and 20, as shown by pulse 22, the circuitry of noise reducer 1 is such that the negative voltage is removed from amplifier 13 allowing the sound to be coupled therethrough to the speaker 14 for reproduction. This action of noise reducer 1 thereby provides a much desired noise immunity during warm-up.

Fig. 2 illustrates in schematic form the circuitry of noise reducer 1 and its relationship with associated components of the TV receiver of Fig. 1. Noise reducer 1 is shown to essentially comprise a diode 23 arranged to conduct only when a positive pulse or voltage is applied thereto, resistor 24 and capacitor 25 cooperating to develop a negative voltage at point 26 upon the conduction of diode 23. The circuitry of reducer 1 further comprises resistors 27, 28, and 29, and capacitor 30 wherein resistors 27 and 28 restrict the amplitude of the waveforms of pulses 20 and 18, respectively, to approximately equal amplitude, capacitor 30 provides D.-C. isolation between the pulse sources and diode 23, and resistor 29 develops a predetermined bias on diode 23 providing a conduction thereof between certain predetermined limits of voltage amplitudes such that diode 23 must have impressed thereon a positive voltage amplitude in excess of the bias developed by resistor 29.

During the warm-up period the voltage of differentiated pulse 18 from circuit 15 dominates the voltage of pulse 20 from the sync separator 21 developed across resistors 28, 27, respectively, due to the non-repetitious occurrence or "running" of pulse 18. Therefore, diode 23 will become conductive causing a negative voltage to be developed at point 26 through cooperation of resistor 24 and capacitor 25 having sufficient magnitude to bias audio amplifier 13 below cut-off, thereby preventing the passage of the output from discriminator 12 to the speaker 14.

After sufficient time has elapsed for the oscillator controlling the sync drive 16 to "lock in" the pulse 18 will become repetitious at an approximate 15 C. P. S. rate enabling coincidence thereof with pulse 20. The polarity and amplitude of pulse 20 will effectively cancel the effect of positive keying pulse 18 in such a manner that diode 23 becomes non-conductive. As a consequence the cut-off voltage at point 26 will be removed allowing the conduction of amplifier 13 for passage of the audio signal for reproduction.

It will be noted that pulse 20 is relatively broader than the narrow differentiated keying pulse 18, therefore, no timing accuracy is required in my noise reducing circuit. Further, it is to be understood that the application of my noise reducing circuit is not restricted to intercarrier sound receivers. By applying the output from noise reducer 1 to the audio amplifier or one of the I. F. amplifiers of the sound portion of a conventional two I. F. strip TV receiver, the same noise reduction during warm-up may be achieved if found to be troublesome to the consumer.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a television receiver having a source of horizontal synchronizing pulses derived from the video signal, a source of keying pulses normally repetitious at the horizontal scanning rate and an audio system; an audio noise reducing means comprising a unidirectional device coupled to each of said sources and at least one stage of said audio system, biasing means coupled to said device responsive to the coincidence of the pulses of said sources to bias said device into non-conduction and responsive to the non-coincidence of the pulses of said sources to bias said device into conduction and means responsive to the conduction of said device to bias said one stage into non-conduction.

2. In a television receiver having a source of horizontal synchronizing pulses derived from the video signal, a source of keying pulses normally repetitious at the horizontal scanning rate and an audio system; an audio noise reducing means comprising a normally non-conductive device in a conduction controlling relationship with at least one stage of said audio system, said one stage having a grid bias network, and means coupling the pulses of said synchronizing source and the pulses of said keying source to said device, said device being rendered conductive during a period of non-coincidence between said synchronizing pulses and said keying pulses to inactivate said one stage, said device being a diode associated with the grid bias network of said one stage.

3. In a television receiver having a source of horizontal synchronizing pulses derived from the video signal, a source of keying pulses normally repetitious at the horizontal scanning rate and an audio system; an audio noise reducing means comprising a diode coupled to each of said sources and at least one stage of said audio system, biasing means coupled to said diode responsive to the coincidence of the pulses of said sources to bias said diode into non-conduction and responsive to the non-coincidence of the pulses of said sources to bias said diode into conduction and means responsive to the conduction of said diode to bias said one stage into non-conduction.

4. In a keyed automatic gain control television receiver the combination of a synchronizing pulse separator, a horizontal synchronizing driver stage, an audio system and a noise reducing means comprising a unidirectional device coupled to at least one stage of said audio system whereby the conduction of said unidirectional device renders said one stage non-conductive, and means coupling the pulse outputs of said separator and said driver stage to said unidirectional device, the non-coincidence of said pulse outputs causing said unidirectional device to conduct and coincidence of said pulse outputs rendering said device non-conductive, said device being a diode having an output circuit comprising a resistive element and a capacitive element arranged in a manner whereby the conduction of said diode charges said capacitive element to produce a sufficient negative voltage to cut off said one stage.

5. In a television receiver having a first source of pulses repetitious at the horizontal scanning rate derived from the video signal, a second source of pulses repetitious at the horizontal scanning rate, a keyed automatic gain control system operating on the pulses of said second source to produce in coincidence therewith keying pulses for repetitious gain control activation of said gain control system, and an audio system; an audio noise reducing means comprising a normally non-conductive device in a conduction controlling relationship with at least one stage of said audio system, means coupling the pulses of said first source to said device, a means coupling the keying pulses of said automatic gain control system to said device, said device being rendered conductive during periods of non-coincidence between the pulses of said first source and the keying pulses of said automatic gain control system and means responsive to the conduction of said device to inactivate said one stage.

6. In a keyed automatic gain control television receiver, the combination of a synchronizing pulse separator, a horizontal synchronizing driver stage, a keyed automatic gain control system operating on the pulse output of said driver stage to produce in coincidence therewith keying pulses for repetitious gain control activation of said gain control system, an audio system and a noise reducing means comprising a unidirectional device coupled to at least one stage of said audio system whereby the conduction of said device renders said one stage non-conductive, means coupling the pulses of said separator to said device and means coupling the keying pulses of said gain control system to said device means responsive to, the non-coincidence of said pulses applied to said device to cause said device to conduct, and means responsive to the conduction of said device to render said one stage non-conductive.

References Cited in the file of this patent

UNITED STATES PATENTS 2,602,855 Cunningham ------------- July 8, 1952
2,632,800 Schlesinger ------------- Mar. 24, 1953